April 22, 1941.   N. C. SCHELLENGER ET AL   2,239,374
UNITARY CASING FOR COMBINED SWITCHES AND RHEOSTATS
Filed Aug. 31, 1934   2 Sheets-Sheet 1

INVENTORS.
WILLIS E. HASELWOOD.
NEWTON C. SCHELLENGER.
BY
ATT'Y.

April 22, 1941.   N. C. SCHELLENGER ET AL   2,239,374
UNITARY CASING FOR COMBINED SWITCHES AND RHEOSTATS
Filed Aug. 31, 1934   2 Sheets-Sheet 2
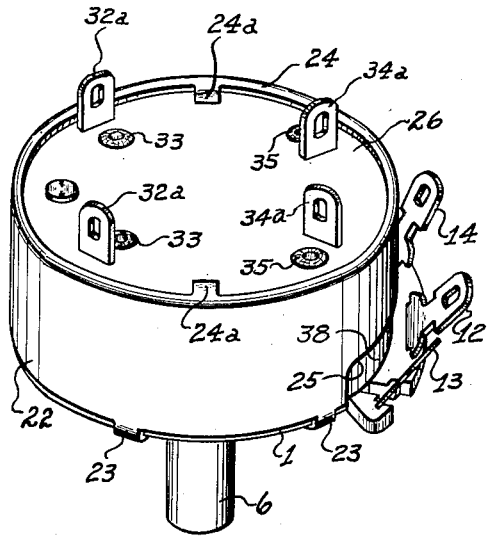
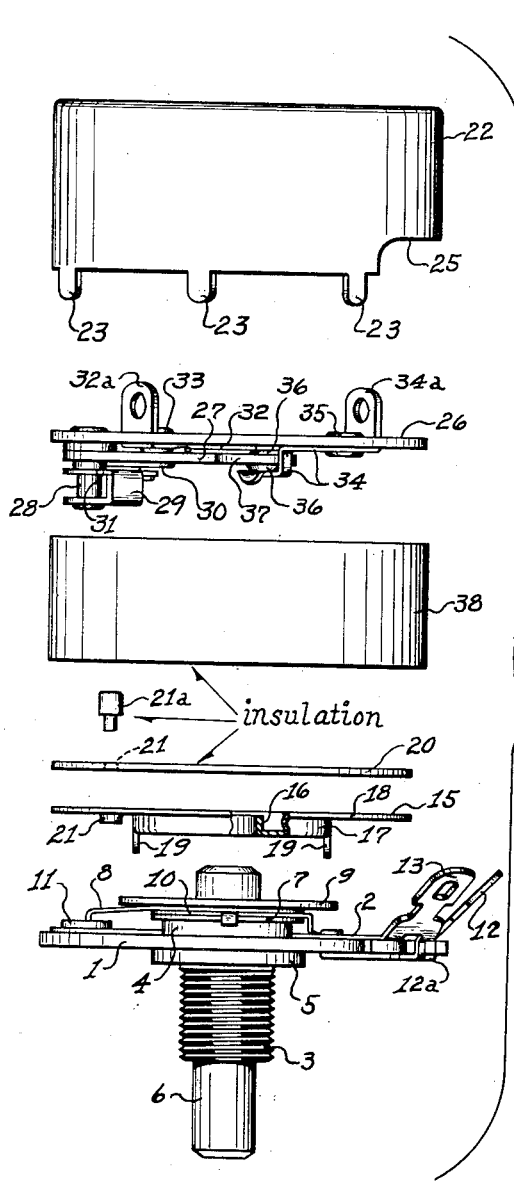
INVENTORS.
WILLIS E. HASELWOOD.
NEWTON C. SCHELLENGER.
BY
ATT'Y.

Patented Apr. 22, 1941

2,239,374

UNITED STATES PATENT OFFICE 2,239,374

UNITARY CASING FOR COMBINED SWITCHES AND RHEOSTATS

Newton C. Schellenger and Willis E. Haselwood, Elkhart, Ind., assignors to Chicago Telephone Supply Co., Elkhart, Ind., a corporation of Indiana Application August 31, 1934, Serial No. 742,226

14 Claims. (Cl. 201—48)

Our invention relates to combined variable resistance devices and power switch units and more particularly to the mounting and housing of such units.

Heretofore, devices of this character have been made in two separate and distinct component parts; to wit, the variable resistance device, and the snap switch. The variable resistance device or volume control, which for the sake of convenience will hereinafter be referred to as the "rheostat," was a complete unit per se, having its component parts enclosed in a suitable housing. The switch was likewise a complete unit per se, having its component parts mounted in a molded Bakelite housing, and being associated with the rheostat only in order that they could both be operated by a single control. Otherwise, the rheostat and the switch were capable of carrying on their respective functions independently of each other.

The housing of the rheostat was apertured to permit cooperation between the switch and rheostat when the switch was fastened thereon, and the switch mounting was left open at the side which was to be disposed against the rheostat housing to permit such cooperation of parts. However, aside from these two differences (or omissions) these two devices were constructed substantially the same way that they would have been were they to be used independently of each other.

The switch mechanisms employed in these devices required that special molded mountings be provided for the mounting thereof. Molded mountings are highly undesirable from the manufacturer's standpoint, since they are not only expensive, adding to the cost of the unit, but they are rarely, if ever, sufficiently accurately molded to permit the component parts of the switch mechanism to be assembled therein to get the proper coaction and cooperation of parts without first having to subject them to some corrective machining operations.

The combined rheostat and switch units were bulkier, due to the molded switch mounting and general arrangement of assembly, and took up a considerable amount of space. Today, the space factor is an important one due to the ever increasing requirements for more compact radio set assemblies. A good example of these compact assemblies is the modern automobile receiving set, which embraces a vastly important commercial field today.

In the old assemblies, the "live" parts of the switch were not completely isolated from the sensitive rheostat circuit. There necessarily had to be an aperture of substantial proportions provided in the casing wall between the rheostat and switch mechanism to permit cooperation between parts of the rheostat and switch for effecting the actuation of the switch. Thus, the fluctuations of the power circuit, not being excluded by an unbroken electrostatic shield, became coupled with the reproducer circuit, whereby undesirable humming sounds and other disturbances became manifest in the reproducer. Another disadvantage in having the rheostat casing and switch mounting openly communicating became apparent when frequently a part would become detached from the switch, as in the case of a spring break, and the loose part would fall or be thrown into the rheostat casing; damaging the resistance, causing a short-circuit within the unit, and/or jamming the movable parts therein, whereby the unit was rendered inoperative.

It is an object of the present invention to provide a compact combined rheostat and switch assembly wherein molded switch mountings are dispensed with.

It is another object of our invention to provide a unitary casing for a combined rheostat and switch unit that is sturdy, compact and inexpensive to manufacture.

It is still another object of our invention to provide a combined rheostat and switch unit wherein the switch and power circuit is completely mechanically and electrostatically shielded from the rheostat and reproducer circuit.

It is a further object of our invention to provide a combined switch and rheostat unit wherein there are no "live" parts, nor parts of conducting material, interconnecting between the rheostat and the switch mechanisms.

With the above objects in view, and others ancillary thereto, we prefer to accomplish one embodiment of our invention as follows:

We provide a hollow, cylindrical, metal shell member of uniform height, that has ears or tongues projecting at spaced peripheral points from both of its edges. An end wall of insulating material is secured to one end of the shell to completely close it, and is held against rotation relative thereto by the tongues. The switch mechanism is carried on the inner face of this end wall by direct mounting, and has its terminal portions projecting through the wall to the exterior face thereof.

A strip of insulation, of the length necessary to completely line the inside surface of the shell member, is disposed within the shell to closely conform to the inner face of the cylindrical walls thereof. This strip of insulation extends in width from the end wall, down the inside of the shell to a peripheral line closely adjacent its other edge.

The remaining open end of the shell is closed by the insulative base member of a rheostat, which carries a resistance element of the planar, carbonaceous type upon its inner face. A metallic bushing or shaft bearing is arranged centrally in this base member, and has a metal shaft journalled therein.

Rotatable with and secured to the inner end of the shaft is a circular, metallic, substantially imperforate disc of such size as to almost touch the strip of insulation disposed within the shell at substantially all points around its periphery, whereby a middle wall of metallic material is provided intermediate the end wall and base member and parallel thereto, which substantially closes the shell intermediate its ends.

A suitable contactor is carried by the shaft beneath the disc, which movably engages the resistance element to vary the effective resistance.

Upon the switch side of the intermediate disc a sheet of insulating material is fastened, which is made the same shape and size as the disc so as to be congruent therewith. A pin member made of insulative material is eccentrically positioned on the disc to engage the switch controller or cam to cause actuation of the switch.

The strip of insulation that lines the shell serves as a spacer to keep the end wall and base spaced a predetermined distance, whereby proper cooperation between the switch, rheostat and associated parts is assured. The ears or tongues adjacent the base are crimped over to hold the base in position, and to render the entire assembly a unity.

The intermediate disc has grounding connection with the shaft, which in turn is grounded through the bushing to a grounding plate and the chassis or base of the radio set upon which it is mounted.

In this manner the intermediate disc constitutes an electrostatic shield which acts to exclude inductive and capacitive coupling between the power circuit at the switch, and the reproducer circuit with which the rheostat is directly associated. The sheet of insulation carried by the disc, and the insulative switch actuating pin, are safeguards against any portion of the switch from coming into contact with the disc to cause a "shorting" or grounding of the power supply circuit.

The shaft, contactor arm and disc are all rotated together whereby the effective resistance is varied and the switch is actuated without there being any communicating apertures between the switch and rheostat chambers.

The novel features which we consider characteristic of our invention are set forth with particularity in the appended claims. The invention itself, however, both as to organization and mode of operation, together with the other advantages thereof, may be understood by reference to the specification annexed hereto, when taken in conjunction with the accompanying drawings in which:

Fig. 5 is an exploded side elevational view of the entire unit showing the relation of parts and their order of assembly.

Fig. 6 is a perspective view of a unit made in accordance with our invention as it appears when assembled and ready for use.

Referring more specifically to the drawings in which like reference characters refer to like parts:

Figures 1, 3:
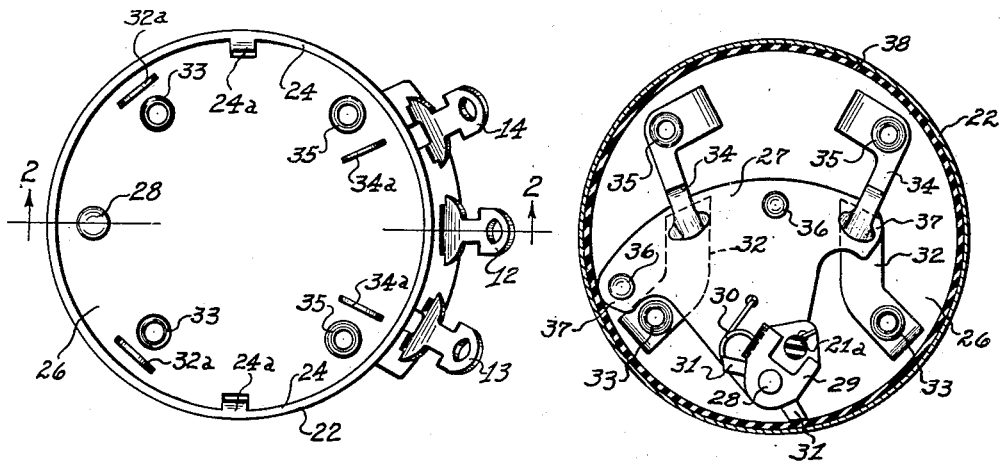
Fig. 1 is a top plan view of an improved variable resistance and power switch unit, constructed in accordance with our invention.
Fig. 3 is a transverse sectional view taken along line 3—3 of Fig. 2, showing the switch mechanism in plan.

The variable resistance device has a main base portion 1 made of insulative material, upon which is mounted a resistance element 2 of the planar carbonaceous type. Centrally located within the base is a metallic bushing 3, which is secured thereto by means of an enlarged shoulder portion 4 at its inner end, and grounding plate 5 on the outer face of the base.

Journalled within the metallic bushing 3 is a drive shaft 6, which extends sufficiently far above the inner face of the base to mount the various parts of the contactor arm assembly and shield.

Atop the inner face of the metallic bushing 3 is an insulator disc 7 for maintaining the contactor out of touch with the bushing and shaft, which are both grounded. The contactor arm proper is a metallic spring-pressed member 8, mounted beneath and revoluble with an insulative drive disc 9, said arm having wiping contact with a collector ring 10 about the shaft.

The resistance element 2 is engaged by a shoe 11 which is moved over the contact surface by the contactor arm 8. The current passes from the resistance element, through the shoe 11 and arm 8, to the central terminal 12, by way of the collector ring 10 and terminal extension 12a.

The ends of the resistance element are connected in the usual way to terminals 13 and 14 respectively.

Mounted upon the inner end of the shaft 6 is a metallic plate 15, which has an extruded portion 16 pressed upon the shaft to tightly engage it. The extruded portion causes the plate to rotate with the shaft, and is accommodated within a depressed portion 17, in the plate. The depressed portion is of such depth as to permit the top edge of the extrusion to lie within or slightly below the plane of the flat lip or rim portion 18 of the plate, in order that a planar disc of insulation may rest thereupon without distortion.

The bottom of the depressed portion 17 is substantially flat to conform to the top surface of the insulator drive disc 9 upon which it presses, and is provided with depending lugs 19, either struck out from the bottom or fastened thereto, which engage suitable notches in the drive disc 9 to effect driving engagement therewith.

By reference to the co-pending application Serial No. 713,973, filed March 5, 1934, now Patent No. 2,059,712, which more fully discloses the rheostat shown herein, it will be seen that disc 9 has driving engagement with the contactor arm 8, whereupon the contactor is moved through a drive plate. The reference characters refer to the present application.

The contactor herein is moved by virtue of the same construction, when the plate 15 is rotated.

Mounted upon the plate 15, is a disc of insulation 20, which is of the same size and of such shape as to completely overlie the plate to cover it. The plate 15 and disc 20 each have an aperture 21 in vertical alignment for receiving a switch actuating pin 21a. The pin has a reduced end registering in the apertures to close them, and the bottom of its head portion bears upon the top surface of the disc of insulation 20. The bottom of the reduced end may be split or swaged to prevent its accidental withdrawal from the plate.

The pin 21a, is preferably made of insulative material, although it may be formed by merely striking up a portion of the lip 18 of the plate in the manner similar to the way lugs 19 are struck from the bottom thereof.

Snugly telescoped upon the base member 1 of the variable resistance device, is a unitary metallic shell 22, which has a plurality of tongues 23 disposed at spaced peripheral points about its lower edge. The upper edge of the shell turns inwardly to form a narrow bearing portion 24, which is equipped with ears 24a.

This shell is preferably made by first forming a metallic cup from a blank with the tongues 23 provided around the rim, then cutting away all of the end wall of the cup except the small amount at 24, and the portions forming ears 24a.

The shell 22 is provided with a cut-away portion 25 to provide clearance for the terminals and the terminal mounting extension of the base 1.

The end of the shell opposite the variable resistance device is closed by an insulative top member 26, which carries upon its inner face the switch mechanism. No moulded mountings are employed in the mounting of the switch; its component parts being fastened directly upon the top 26.

The switch is of the snap switch type and is comprised of a rocker arm 27 of insulative material, pivotally mounted upon an enlarged portion of the pivot pin 28. This pin 28 extends through the top member and is held fast thereto by an integral shoulder on the inside and an upset head portion on the outside of said top; the inside shoulder serving to space the rocker arm from the inside surface thereof.

The shank of the pin 28 projects downwardly to accommodate the rocker arm actuating cam 29, to form a pivot therefor. The cam is caused to actuate the rocker arm in an oscillatory snap action by means of spring 30, which is fastened at its opposite ends to the rocker and cam respectively, whereby the usual lost motion drive is effected. The rotary movement of the cam 29 is limited by integral legs 31, which project therefrom and engage the side walls of the casing.

Fastened to the top member 26 are contact pieces 32, which underlie the rocker arm, and are made secure by rivets 33. The end portions of these pieces are bent to pass upwardly and outwardly through slots in the top, to form terminals 32a. Complementary contact pieces 34 are secured to the top by rivets 35, and at one end are bent to pass upwardly and outwardly through slots in the top, to form terminals 34a. These contact pieces 34, intermediate the rivets and their inner ends are bent in a reverse curve to overlie the rocker arm so as to permit the arm to move beneath their end portions.

The inner end portions of contact pieces 32 and 34 are in vertical alignment, and are disposed within the path of movement of the contact engaging buttons 36, which are carried by the rocker arm. The contact pieces 34, being of spring metal, tend to bear upon the rocker arm and are shaped at their ends to permit the contacting buttons 36 to slide beneath them, thereby displacing them away from the contact pieces 32 to effect a positive electrical contact therebetween.

The movement of the rocker arm is limited by the abutting of integral projections 37 thereon against the side of the casing.

At one extreme of its throw, the rocker arm positions the buttons 36 between the contact pieces 32 and 34 to effectually close the circuit; the buttons being made of conductive material. At the other extreme of the throw of the rocker arm, the buttons are withdrawn from contact with the contact pieces, and a section of the rocker arm (which is of dielectric material) is disposed therebetween instead, whereby arcing between the poles or dielectrical disturbances are eliminated (see Fig. 3).

The top 26 is spaced from the base 1 by a unitary lining strip 38 of insulative material, which is disposed entirely around the inner face of the cylindrical shell 22. The strip 38 is almost as wide as the shell is high, except for a narrow margin adjacent each edge of the shell, which in depth, is equivalent to the thickness of the base at one edge, and the top at the other. This spacing provides bearing shoulders or annular seats, formed by the edges of the strip 38 and the inner sides of the shell, adjacent the upper and lower edges thereof.

The base is positioned firmly in this seat and is held in position by the tongues 23, which crimp over to engage its exterior surface. The top 26 is held between the top edge of the strip 38 and the inturned rim 24 of the shell, and is held against rotative movement relative to the shell by ears 24a, which turn inwardly and downwardly to register in slots or notches in the top provided therefor.

The strip 38 not only serves to insulate the switch and rheostat from the metallic shell, but also serves as a dust proof seal for the unit, since it is resilient, and its edges conform to the top and base. Also, the strip closes the cut-away portion 25 of the shell at the terminals.

The order of assembly of the entire unit appears in Fig. 5. The shell is the first item in the order, and receives the switch-carrying top at its upper end so that ears 24a register in slots provided for them in the top, and so that the switch mechanism is disposed inwardly.

The circular band of insulation 38 is the next in order, and is telescoped in the shell until its upper edge bears against the inner face of the top member.

Figures 2, 4:
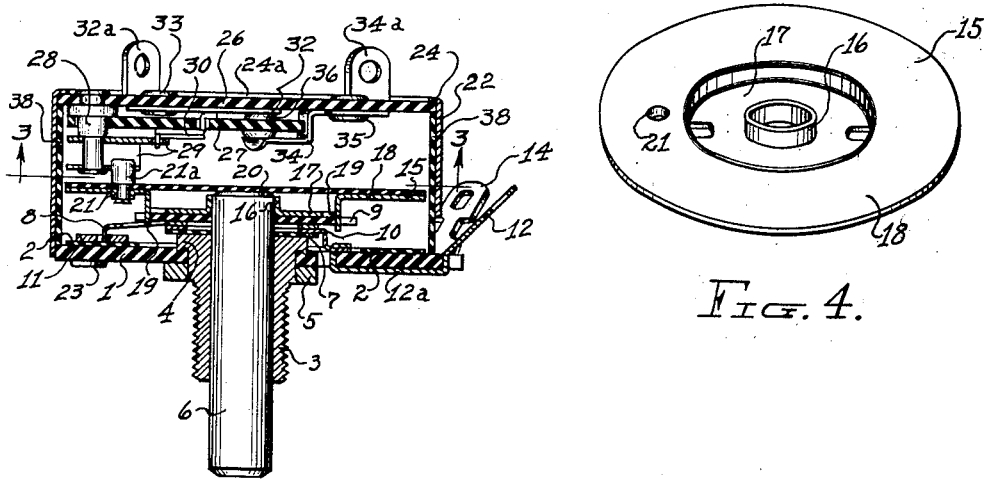
Fig. 2 is a vertical sectional view taken along line 2—2 of Fig. 1.
Fig. 4 is a perspective view of the interposed metallic disc or electrostatic shield.

The electrostatic shield plate, together with its insulating disc and switch actuating pin, is secured to the rheostat shaft as shown in Fig. 2, and as has been hereinbefore described.

The base, mounting the shaft and variable resistance devices, is then telescoped within the shell until its inner face abuts the lower edge of the insulative liner strip, whereupon the tongues about the lower rim of the shell are crimped over to secure the base in position, and by virtue of the liner strip, to secure the top in position also. In this manner any and all axial movement between the component parts of the unit is absolutely excluded.

It will be seen by reference to Fig. 2, that the metallic plate carried by the end of the shaft is but slightly smaller than the internal diameter of the lined shell, whereby a rotatable middle partition is provided between the switch and rheostat.

The plate is grounded on the shaft, which is grounded through the metallic bushing 3 to grounding plate 5. The grounding plate has ground connection with a base or chassis of a radio set (not shown).

In this manner, an electrostatic shield is provided between the switch and rheostat whereby all inductive or capacitive coupling between them is eliminated.

This plate, to be effective as an electrostatic shield, need not be absolutely imperforate, provided the perforations, if made, be sufficiently small to not detract materially from its shielding properties. Of course, if the perforations are too large, the shielding properties are destroyed. However, the apertures resulting from the punching out of ears 19, are not sufficiently large to impair the shielding properties, nor would many such apertures. A switch actuating lug could be struck-up from the plate without affecting the shielding properties thereof, but this is not preferred for other reasons. We have sought to avoid any and all structures and assemblies wherein there is any intercommunication between the rheostat and switch chambers, either directly, (as by openings of material size), or indirectly, (as by conductive materials projecting therebetween). In the present structure, by employing a switch actuating pin of non-conducting material, the switch is completely isolated, and in the event of a spring break or other failure, there is nothing to be contacted in the switch chamber to cause a short-circuit of the power circuit. If a portion of the plate projected through the insulation, there is a possibility that this could happen.

The present invention is marked by its simplicity of structure and compactness of assembly. The switch and rheostat are both mounted within a common housing of integral design, whereby durability and rigidity are secured. The switch is completely isolated from the rheostat, both mechanically and electrostatically, for the first time since combined rheostat and power switch units have been built.

The operation of the unit is as follows:

As the shaft 6 is rotated to move the contactor from its low resistance position relative to the resistance element, the plate 15 is rotated with it. Switch actuating pin 21a is moved to engage the switch actuating cam 29. Fig. 3 illustrates the relation of the pin to the switch cam at the beginning of this movement. The cam is tripped to its opposite position to cause the spring 30 to snap the rocker arm in the reverse direction to its opposite position. The contact buttons 36 are thereby forced between the contact pieces 32—34 to close the circuit therebetween, whereby the reproducer circuit is energized. Further rotation of the shaft in the same direction varies the effective resistance. Upon reverse rotative movement, the contactor is brought toward the low resistance end of the element, and the pin 21a engages the cam 29 to actuate the switch to open position. The switch and pin are thereby once more returned to the position illustrated in Fig. 3.

The devices illustrated in the drawings hereof have been considerably enlarged to lend clarity to the description, and to facilitate an expeditious understanding of the inventions set forth herein.

We claim:

1. A combined rheostat and switch comprising: a housing; rheostat mechanism in the housing; switch mechanism in the housing; a substantially imperforate movable metallic wall within the housing between said mechanisms and substantially closing the housing therebetween; and means including said metallic wall for jointly operating the rheostat and switch.

2. A unitary rheostat and power switch device comprising a cylindrical shell member, a base member having resistance varying mechanism mounted thereon disposed at one end of said shell member, a top member having switch mechanism mounted thereon disposed at the other end of said shell member, a substantially imperforate, rotatable, metallic wall disposed intermediate said mechanisms to close the shell therebetween, and means including said metallic wall for jointly operating the rheostat and switch.

3. A unitary rheostat and power switch device comprising: a cylindrical, metallic shell member; a lining of insulation on the inner wall of the shell member; a base member having resistance varying mechanism mounted thereon and disposed at one edge of said insulation lining; a top member having switch mechanism mounted thereon and disposed at the other edge of said insulation lining; a movable metallic partition disposed intermediate said mechanisms and having its periphery closely adjacent to the inner surface of the insulation lining to divide the shell into two substantially non-communicating chambers and provide an electric shield between the mechanisms; and means including said partition for jointly operating the rheostat and switch.

4. A unitary rheostat and switch device comprising: an enclosed unitary casing; a rheostat mounted at one end of the casing; a switch mounted at the other end of the casing; a solid movable metallic wall between said rheostat and switch, said metallic wall being of substantially the same size and shape as the inside cross sectional area of said casing so as to substantially close the same between the rheostat and switch and thus form an electrostatic shield therebetween; and means including said metallic wall for jointly operating the rheostat and switch.

5. In a variable resistance and power switch unit, a unitary casing, end walls for said casing removably attached thereto, a resistance element disposed upon the inner face of one of said end walls, switch mechanism mounted upon the inner face of the other end wall, a grounded shaft journalled in one of said end walls, a metallic disc having ground connection with said shaft mounted thereon for rotation therewith substantially closing the casing intermediate its ends, means on said shaft to vary the effective resistance, and means on said disc to actuate the switch mechanism.

6. A combined rheostat and switch comprising: an integral shell providing the side walls of a casing; end walls closing the opposite ends of said casing; a revoluble electrostatic shield disposed intermediate said end walls and partitioning the casing into two substantially non-communicating chambers; rheostat mechanism in one of said chambers; switch mechanism in the other of said chambers; and means including said shield for jointly actuating said mechanisms.

7. A combined volume control and power switch unit comprising: a volume control chamber having a variable resistance mechanism including a resistance element and a rotatable resistance contactor, mounted therein; a switch chamber adjacent to the volume control chamber, said switch chamber having side walls and a substantially planar metallic end wall rotatable in unison with said contactor and having a substantially imperforate portion overlying the resistance element; switch mechanism in the switch chamber electrostatically shielded from the resistance mechanism by said rotatable wall; and means carried by said rotatable wall for actuating the switch mechanism.

8. A combined variable resistance control and switch comprising: a housing; variable resistance mechanism including a resistance element mounted in the housing; switch mechanism in the housing; a rotatable metallic disc within the housing between said mechanisms, said disc having a substantially imperforate portion overlying the resistance element to effectively electrostatically shield the mechanisms from each other; and means including said metallic disc for jointly operating the two mechanisms.

9. A variable resistance and power switch unit of the character described comprising: a housing; a resistance element disposed within the housing; switch mechanism disposed within the housing in close proximity to the resistance element; a grounded shaft supported for rotation and extending into the housing; a metallic disk directly fixed to said shaft within the housing, and interposed between but electrically insulated from the resistance element and the switch mechanism; said disk being of such size that its peripheral edge is close to the adjacent housing wall so as to divide the interior of the housing into substantially non-communicating resistance and switch compartments; means actuated by the shaft for varying the effective resistance of said resistance element; and means on the disk for actuating the switch mechanism.

10. A combined rheostat and switch comprising: a housing; rheostat mechanism within the housing; switch mechanism within the housing, said mechanisms occupying spaced-apart portions of the housing; a metallic shaft supported for rotation and extending into the housing; a substantially imperforate metallic wall drivingly and electrically connected to said shaft and disposed in the space between the two mechanisms, said substantially imperforate metallic wall having sufficient area to effectively electrostatically shield the mechanisms from each other; a movable contactor for the rheostat; means driven by the shaft and including a spring contactor arm for moving the contactor; and a switch actuator carried by the substantially imperforate wall for actuating the switch during part of the rotation of the shaft.

11. In a combined volume control and power switch unit, cooperatively associated volume control and power switch mechanisms each occupying separate, non-communicating chambers within a common housing, a rotatable metallic wall separating the chambers, means for actuating the volume control and rotating the wall, and switch actuating means mounted upon said rotatable metallic wall entirely within the switch chamber for causing operation of the switch.

12. In a variable resistance and power switch unit, a housing having walls closing the ends thereof, a resistance element supported within said housing adjacent one of said end walls, switch mechanism mounted within said housing adjacent the other end wall, a grounded shaft journalled in one of said end walls, a metallic disk within said housing having ground connection with said shaft and mounted thereon for rotation therewith, the edge of said disk being closely adjacent the inner peripheral wall of said housing and said disk presenting a grounded metal wall interposed between and in spaced relation to said resistance element and said switch mechanism and sufficiently continuous to preclude inductive and capacitive coupling between the power circuit at the switch and the circuit with which the resistance element is associated, means actuated by the shaft to vary the effective resistance and means on said disk to actuate the switch mechanism.

13. A variable resistance and power switch unit of the character described comprising a housing having walls closing the ends thereof, a resistance element supported within the housing adjacent one of said end walls, switch mechanism mounted within said housing adjacent the other end wall, a grounded shaft journalled in one of said end walls, a metallic disk within said housing having ground connection with said shaft and mounted thereon for rotation therewith and interposed between and in spaced relation to said resistance element and said switch mechanism, said metallic disk having a substantially imperforate portion overlying the resistance element to preclude inductive and capacitive coupling between the power circuit at the switch and the circuit with which the resistance element is associated, means actuated by the shaft to vary the effective resistance of said element, and means on said disk to actuate said switch mechanism.

14. In a combined rheostat and switch: a housing; rheostat mechanism in one end of the housing; switch mechanism in the opposite end of the housing so as to be substantially directly opposite the rheostat mechanism; a rotatable metallic disc in the housing between the two mechanisms, said disc covering an area at least substantially as great as that of the rheostat mechanism and being substantially unbroken so as to effectively shield the mechanisms from each other; common means for operating the rheostat and rotating the disc; and means on the disc for actuating the switch mechanism.

NEWTON C. SCHELLENGER.
WILLIS E. HASELWOOD.